US011904411B2

United States Patent
Kishi et al.

(10) Patent No.: US 11,904,411 B2
(45) Date of Patent: Feb. 20, 2024

(54) METHOD FOR PRODUCING THIN GLASS RESIN LAMINATE PIECE

(71) Applicant: NITTO DENKO CORPORATION, Ibaraki (JP)

(72) Inventors: Atsushi Kishi, Ibaraki (JP); Takeshi Murashige, Ibaraki (JP); Satoshi Hirata, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 399 days.

(21) Appl. No.: 17/420,233

(22) PCT Filed: Jan. 15, 2020

(86) PCT No.: PCT/JP2020/000957
§ 371 (c)(1),
(2) Date: Jul. 1, 2021

(87) PCT Pub. No.: WO2020/153178
PCT Pub. Date: Jul. 30, 2020

(65) Prior Publication Data
US 2022/0080530 A1    Mar. 17, 2022

(30) Foreign Application Priority Data
Jan. 23, 2019    (JP) .................................. 2019-009313

(51) Int. Cl.
*B23K 26/40*    (2014.01)
*B23K 26/402*    (2014.01)
(Continued)

(52) U.S. Cl.
CPC ........ *B23K 26/402* (2013.01); *B23K 26/0006* (2013.01); *B23K 26/38* (2013.01);
(Continued)

(58) Field of Classification Search
CPC ..................................................... B23K 26/40
See application file for complete search history.

(56) References Cited

U.S. PATENT DOCUMENTS

| 6,815,070 B1 | 11/2004 | Burkle et al. |
| 6,853,123 B1 | 2/2005 | Nattermann et al. |

(Continued)

FOREIGN PATENT DOCUMENTS

| CN | 101901775 A | 12/2010 |
| CN | 105073660 A | 11/2015 |

(Continued)

OTHER PUBLICATIONS

Office Action dated Aug. 15, 2022, issued in counterpart CN application No. 202080010610.3, with English translation. (10 pages).

(Continued)

*Primary Examiner* — Jeffry H Aftergut
(74) *Attorney, Agent, or Firm* — WHDA, LLP

(57) ABSTRACT

Provided is a method of producing a thin glass resin laminate piece, which includes cutting a thin glass resin laminate through laser processing, and by which a thin glass resin laminate piece capable of preventing the occurrence of air bubbles when bonded to an adherend can be obtained. The method of producing a thin glass resin laminate piece of the present invention includes a step of subjecting a thin glass resin laminate including a thin glass, a resin layer, and a pressure-sensitive adhesive layer in the stated order to laser processing to cut the laminate, wherein a thickness (μm) of the pressure-sensitive adhesive layer and a creep characteristic (μm/Hr) of the pressure-sensitive adhesive layer have a relationship of (thickness (μm))$^2$×creep characteristic (μm/Hr)≥50×10$^3$ (μm$^2$·μm/Hr).

7 Claims, 1 Drawing Sheet

(51) Int. Cl.
  *B32B 17/10*    (2006.01)
  *B23K 26/57*    (2014.01)
  *C09J 7/29*    (2018.01)
  *C09J 7/38*    (2018.01)
  *B23K 26/00*    (2014.01)
  *B23K 26/38*    (2014.01)
  *B23K 103/16*    (2006.01)
  *B23K 103/00*    (2006.01)

(52) U.S. Cl.
  CPC .............. *B23K 26/57* (2015.10); *B32B 17/10* (2013.01); *C09J 7/29* (2018.01); *C09J 7/38* (2018.01); *B23K 2103/172* (2018.08); *B23K 2103/54* (2018.08); *C09J 2400/14* (2013.01)

(56) References Cited

U.S. PATENT DOCUMENTS

| | | | |
|---|---|---|---|
| 8,703,584 | B2 | 4/2014 | Misumi et al. |
| 10,118,255 | B2 | 11/2018 | Ciou et al. |
| 11,052,645 | B2 | 7/2021 | Tsuji et al. |
| 11,192,349 | B2 | 12/2021 | Oderkerk et al. |
| 11,241,863 | B2 | 2/2022 | Murashige et al. |
| 2010/0301497 | A1 | 12/2010 | Misumi et al. |
| 2015/0367621 | A1 | 12/2015 | Murashige et al. |
| 2016/0085007 | A1 | 3/2016 | Akizuki et al. |
| 2016/0288249 | A1 | 10/2016 | Ciou et al. |
| 2019/0055393 | A1 | 2/2019 | Tsuji et al. |
| 2019/0270663 | A1 | 9/2019 | Murashige et al. |
| 2020/0290331 | A1 | 9/2020 | Oderkerk et al. |
| 2022/0118739 | A1 | 4/2022 | Murashige et al. |

FOREIGN PATENT DOCUMENTS

| | | |
|---|---|---|
| CN | 106427137 A | 2/2017 |
| CN | 108779304 A | 11/2018 |
| EP | 2 960 216 A1 | 12/2015 |
| JP | 4122139 B2 | 7/2008 |
| JP | 2014-159352 A | 9/2014 |
| JP | 2014-191051 A | 10/2014 |
| JP | 2016-83926 A | 5/2016 |
| JP | 2016-193804 A | 11/2016 |
| JP | 2016-193814 A | 11/2016 |
| JP | 2017-30324 A | 2/2017 |
| TW | 201803922 A | 2/2018 |
| WO | WO-2009/057460 A1 * | 5/2009 |
| WO | 2014/159168 A1 | 10/2014 |
| WO | 2018/079546 A1 | 5/2018 |

OTHER PUBLICATIONS

Extended (Supplementary) European Search Report dated Sep. 22, 2022, issued in counterpart EP application No. 20745796.1. (5 pages).
International Search Report dated Feb. 18, 2020, issued in counterpart International Application No. PCT/JP2020/000957. (2 pages).
Office Action dated Aug. 2, 2023, issued in counterpart TW application No. 109102161 with English translation. (7 pages).

* cited by examiner

METHOD FOR PRODUCING THIN GLASS RESIN LAMINATE PIECE

TECHNICAL FIELD

The present invention relates to a method of producing a thin glass resin laminate piece.

BACKGROUND ART

A flexible thin glass can be handled by a roll-to-roll process, and in particular, a laminate (thin glass resin laminate) formed by laminating a resin layer on the thin glass can be handled like a film. In addition, the thin glass resin laminate is advantageous in that the laminate can be easily bonded to an adherend with a roller or the like.

Meanwhile, various methods have heretofore been known as methods of turning members, such as a substrate, into small pieces each having a desired size. Of those, laser processing has been suitably adopted as a method by which both of tact and end surface quality (handleability) can be achieved.

CITATION LIST

Patent Literature

[PTL 1] JP 4122139 B2

SUMMARY OF INVENTION

Technical Problem

Also in the above-mentioned thin glass resin laminate, the laser processing is preferably used from the viewpoints of the tact and end surface quality of the laminate. Meanwhile, however, the inventors of the present invention have found that when the thin glass resin laminate, which has further arranged therein a pressure-sensitive adhesive layer for bonding to an adherend and includes the thin glass, the resin layer, and the pressure-sensitive adhesive layer in the stated order, is subjected to the laser processing, in the case where the resultant laminate piece is bonded to the adherend, air bubbles tend to occur in the pressure-sensitive adhesive layer. Such problem hardly occurs when the thin glass alone is bonded to the adherend via the pressure-sensitive adhesive layer or when a method except the laser processing (e.g., cutting with an end mill) is adopted, and the problem remarkably occurs after the thin glass resin laminate including the resin layer has been subjected to the laser processing. In addition, many of the air bubbles are found in an end portion of the bonded laminate piece, and it is difficult to remove the air bubbles even when heat treatment with an autoclave or the like is performed. Although the air bubbles found in the end portion of the laminate piece have not heretofore been perceived as a problem in some cases, along with a recent growing demand for an improvement in quality of a product and from the viewpoint of an improvement in yield thereof, it is desired that the air bubbles found in the end portion of the laminate piece be removed.

The present invention has been made to solve such a novel problem specific to a thin glass resin laminate as described above, and an object of the present invention is to provide a method of producing a thin glass resin laminate piece, which includes cutting a thin glass resin laminate through laser processing, and by which a thin glass resin laminate piece capable of preventing the occurrence of air bubbles when bonded to an adherend can be obtained.

Solution to Problem

According to one embodiment of the present invention, there is provided a method of producing a thin glass resin laminate piece, including a step of subjecting a thin glass resin laminate including a thin glass, a resin layer, and a pressure-sensitive adhesive layer in the stated order to laser processing to cut the laminate, wherein a thickness ($\mu$m) of the pressure-sensitive adhesive layer and a creep characteristic ($\mu$m/Hr) of the pressure-sensitive adhesive layer have a relationship of (thickness ($\mu$m))$^2$×creep characteristic ($\mu$m/Hr)≥50×10$^3$ ($\mu$m$^2$·$\mu$m/Hr).

In one embodiment, the thickness of the pressure-sensitive adhesive layer is 10 $\mu$m or more.

In one embodiment, the creep characteristic of the pressure-sensitive adhesive layer is 100 $\mu$m/Hr or more.

In one embodiment, the resin layer is a polarizing plate.

In one embodiment, the step of subjecting the thin glass resin laminate to the laser processing to cut the laminate includes the steps of irradiating a surface of the thin glass with laser light, and irradiating a surface of the resin layer with laser light, and a laser to be used for the resin layer and a laser to be used for the thin glass are different lasers.

In one embodiment, the laser to be used for the irradiation of the thin glass with the laser light is an ultrashort pulse laser.

In one embodiment, the laser to be used for the irradiation of the resin layer with the laser light is a $CO_2$ laser, a CO laser, a visible light pulse laser, or a UV pulse laser.

Advantageous Effects of Invention

According to the present invention, the method of producing a thin glass resin laminate piece, which includes cutting a thin glass resin laminate through laser processing, and by which a thin glass resin laminate piece capable of preventing the occurrence of air bubbles when bonded to an adherend can be obtained, can be provided.

DESCRIPTION OF EMBODIMENTS

A. Method of Producing Thin Glass Resin Laminate Piece

A method of producing a thin glass resin laminate piece of the present invention includes subjecting a thin glass resin laminate A to laser processing to cut the laminate. According to the production method, a thin glass resin laminate piece a having a size smaller than that of the thin glass resin laminate A can be obtained by the laser processing.

Figure 1:
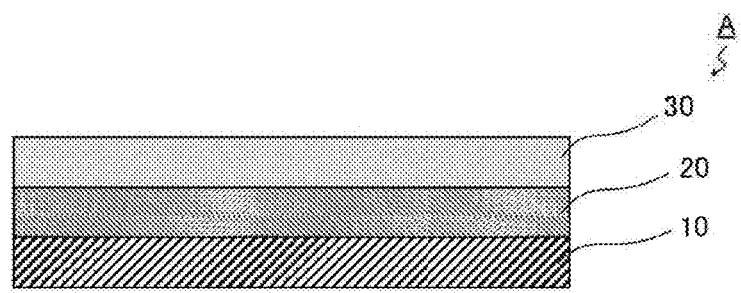
FIG. 1(a) is a schematic sectional view of a thin glass resin laminate A to be used in a production method according to one embodiment of the present invention.
FIG. 1(b) is a schematic sectional view of a thin glass resin laminate piece a obtained by the production method according to one embodiment of the present invention.
Figure 1:
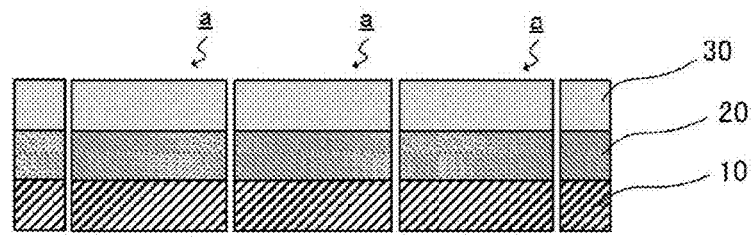

FIG. 1(a) is a schematic sectional view of the thin glass resin laminate A to be used in the production method according to one embodiment of the present invention. The thin glass resin laminate A includes a thin glass 10, a resin layer 20, and a pressure-sensitive adhesive layer 30 in the stated order. The thickness of the thin glass 10 is 100 μm or less. FIG. 1(b) is a schematic sectional view of the thin glass resin laminate piece a obtained by the production method according to one embodiment of the present invention. The thin glass resin laminate piece a is a laminate piece obtained by cutting the thin glass resin laminate A, and may be of such a form that the plan view shape of the thin glass resin laminate A is reduced in size. In FIG. 1(b), for convenience, a section of the thin glass resin laminate piece a is illustrated so that the section may be a surface perpendicular to the main surface of the piece, and so that an end surface of the thin glass, an end surface of the resin layer, and an end surface of the pressure-sensitive adhesive layer may be flush with each other. However, actual end surface shapes are not limited to such shapes, and may be oblique to the main surface, or may have steps or unevenness.

A-1. Pressure-Sensitive Adhesive Layer

In the present invention, the thickness (μm) of the pressure-sensitive adhesive layer and the creep characteristic (μm/Hr) of the pressure-sensitive adhesive layer have a relationship of (thickness (μm))$^2$×creep characteristic (μm/Hr)≥50×10$^3$ (μm$^2$·μm/Hr). When the pressure-sensitive adhesive layer is formed as described above, even in the case where the thin glass resin laminate A is turned into small pieces by the laser processing, the thin glass resin laminate piece a that is prevented from causing air bubbles when bonded can be obtained. The product "(thickness (μm))$^2$× creep characteristic (μm/Hr)" is more preferably more than 100×10$^3$ (μm$^2$·μm/Hr), still more preferably 105×10$^3$ (μm$^2$·μm/Hr) or more, particularly preferably 150×10$^3$ (μm$^2$·μm/Hr) or more, most preferably 180×10$^3$ (μm$^2$·μm/Hr) or more. When the product falls within such ranges, the above-mentioned effect of the present invention becomes particularly significant. The upper limit value of the product "(thickness (μm))$^2$×creep characteristic (μm/Hr)" is, for example, 3,000×10$^3$ (μm$^2$·μm/Hr), preferably 2,000×10$^3$ (μm$^2$·μm/Hr), more preferably 1,000×10$^3$ (μm$^2$·μm/Hr).

The thickness of the pressure-sensitive adhesive layer is preferably 10 μm or more, more preferably 20 μm or more, still more preferably 30 μm or more, particularly preferably 40 μm or more. When the thickness falls within such ranges, the thin glass resin laminate piece a having a particularly excellent preventing effect on the occurrence of air bubbles when bonded can be obtained. The upper limit value of the thickness of the pressure-sensitive adhesive layer is, for example, 200 μm, preferably 100 μm, more preferably 80 μm.

The creep characteristic of the pressure-sensitive adhesive layer is preferably 100 μm/Hr or more, more preferably 120 μm/Hr or more, still more preferably 150 μm/Hr or more, particularly preferably 200 μm/Hr or more, most preferably 250 μm/Hr or more. When the creep characteristic falls within such ranges, the thin glass resin laminate piece a having a particularly excellent preventing effect on the occurrence of air bubbles when bonded can be obtained. The upper limit value of the creep characteristic of the pressure-sensitive adhesive layer is, for example, 1,000 μm/Hr, preferably 900 μm/Hr, more preferably 600 μm/Hr. The term "creep characteristic" as used herein refers to a shift amount 1 hour after the application of a tensile shear force of 500 g to the layer under an environment at 23° C.

The modulus of elasticity of the pressure-sensitive adhesive layer is preferably from 0.01 N/mm to 1 N/mm, more preferably from 0.05 N/mm to 0.8 N/mm, still more preferably from 0.08 N/mm to 0.5 N/mm, still more preferably from 0.08 N/mm to 0.2 N/mm. The term "modulus of elasticity" as used herein refers to a storage modulus of elasticity obtained by dynamic viscoelasticity measurement.

(Pressure-Sensitive Adhesive)

The pressure-sensitive adhesive layer is formed of any appropriate pressure-sensitive adhesive. Examples thereof include a rubber-based pressure-sensitive adhesive, an acrylic pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

In one embodiment, the pressure-sensitive adhesive layer includes an acrylic pressure-sensitive adhesive. The acrylic pressure-sensitive adhesive typically contains a (meth)acrylic polymer as a base polymer. The content ratio of the (meth)acrylic polymer in the acrylic pressure-sensitive adhesive is preferably 50 parts by weight or more, more preferably 70 parts by weight or more with respect to 100 parts by weight of the total solid content in the acrylic pressure-sensitive adhesive.

The (meth)acrylic polymer contains a constituent unit derived from an alkyl (meth)acrylate. Examples of the alkyl (meth)acrylate may include alkyl (meth)acrylates each having a linear or branched alkyl group having 1 to 18 carbon atoms. Examples of the alkyl group include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, and an octadecyl group. Those alkyl groups may be used alone or in combination thereof. The average number of carbon atoms of those alkyl groups is preferably from 3 to 9.

The content ratio of the constituent unit derived from the alkyl (meth)acrylate is preferably 70 parts by weight or more with respect to 100 parts by weight of the (meth)acrylic polymer.

The (meth)acrylic polymer may further contain a constituent unit derived from any other monomer, such as a carboxyl group-containing monomer, a hydroxyl group-containing monomer, an amide group-containing monomer, or an aromatic ring-containing (meth)acrylate. When the pressure-sensitive adhesive contains a cross-linking agent, the carboxyl group-containing monomer, the hydroxyl group-containing monomer, the amide group-containing monomer, or the aromatic ring-containing (meth)acrylate serves as a reaction site with the cross-linking agent. In particular, the carboxyl group-containing monomer or the hydroxyl group-containing monomer is rich in reactivity with an intermolecular cross-linking agent, and is hence preferably used for improving the cohesiveness and heat resistance of the pressure-sensitive adhesive layer to be obtained. In addition, a copolymerizable monomer having a functional group containing an unsaturated double bond, such as a (meth)acryloyl group or a vinyl group, may be used as the other monomer.

The carboxyl group-containing monomer is a compound containing a carboxyl group in its structure and containing a group having a polymerizable unsaturated double bond, such as a (meth)acryloyl group or a vinyl group. Specific examples of the carboxyl group-containing monomer include (meth)acrylic acid, carboxyethyl (meth)acrylate, carboxypentyl (meth)acrylate, itaconic acid, maleic acid, fumaric acid, and crotonic acid.

The content ratio of a constituent unit derived from the carboxyl group-containing monomer is preferably 10 parts by weight or less, more preferably from 0.01 part by weight to 10 parts by weight, still more preferably from 0.05 part by weight to 5 parts by weight, particularly preferably from 0.05 part by weight to 3 parts by weight with respect to 100 parts by weight of the (meth)acrylic polymer. When the content ratio falls within such ranges, the thin glass resin laminate A and the thin glass resin laminate piece a each of which is excellent in durability and reworkability can be obtained.

The hydroxyl group-containing monomer is a compound containing a hydroxyl group in its structure and containing a group having a polymerizable unsaturated double bond, such as a (meth)acryloyl group or a vinyl group. Specific examples of the hydroxyl group-containing monomer include: hydroxyalkyl (meth)acrylates, such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and (4-hydroxymethylcyclohexyl)-methyl acrylate. Of the hydroxyl group-containing monomers, 2-hydroxyethyl (meth)acrylate and 4-hydroxybutyl (meth)acrylate are preferred, and 4-hydroxybutyl (meth)acrylate is particularly preferred from the viewpoint of durability.

The content ratio of a constituent unit derived from the hydroxyl group-containing monomer is preferably 3 parts by weight or less, more preferably from 0.01 part by weight to 3 parts by weight, still more preferably from 0.1 part by weight to 2 parts by weight, particularly preferably from 0.2 part by weight to 2 parts by weight with respect to 100 parts by weight of the (meth)acrylic polymer. When the content ratio falls within such ranges, the thin glass resin laminate A and the thin glass resin laminate piece a each of which is excellent in durability and pressure-sensitive adhesive characteristic can be obtained.

The amide group-containing monomer is a compound containing an amide group in its structure and containing a group having a polymerizable unsaturated double bond, such as a (meth)acryloyl group or a vinyl group. Specific examples of the amide group-containing monomer include: acrylamide-based monomers, such as (meth)acrylamide, N,N-dimethyl(meth)acrylamide, N,N-diethyl(meth)acrylamide, N-isopropylacrylamide, N-methyl(meth)acrylamide, N-butyl(meth)acrylamide, N-hexyl(meth)acrylamide, N-methylol(meth)acrylamide, N-methylol-N-propane(meth)acrylamide, aminomethyl(meth)acrylamide, aminoethyl(meth)acrylamide, mercaptomethyl(meth)acrylamide, and mercaptoethyl(meth)acrylamide; N-acryloyl heterocyclic monomers, such as N-(meth)acryloylmorpholine, N-(meth)acryloylpiperidine, and N-(meth)acryloylpyrrolidine; and N-vinyl group-containing lactam-based monomers, such as N-vinylpyrrolidone and N-vinyl-ε-caprolactam.

The content ratio of a constituent unit derived from the amide group-containing monomer is preferably 10 parts by weight or less, more preferably from 0.1 part by weight to 10 parts by weight, still more preferably from 0.3 part by weight to 8 parts by weight, particularly preferably from 0.3 part by weight to 5 parts by weight, most preferably from 0.7 part by weight to 4 parts by weight with respect to 100 parts by weight of the (meth)acrylic polymer. When the content ratio falls within such ranges, the thin glass resin laminate A and the thin glass resin laminate piece a each of which is excellent in durability and pressure-sensitive adhesive characteristic can be obtained.

The aromatic ring-containing (meth)acrylate is a compound having an aromatic ring structure in its structure and containing a (meth)acryloyl group. The aromatic ring is, for example, a benzene ring, a naphthalene ring, or a biphenyl ring. Specific examples of the aromatic ring-containing (meth)acrylate include: (meth)acrylates each having a benzene ring, such as benzyl (meth)acrylate, phenyl (meth)acrylate, o-phenylphenol (meth)acrylate, phenoxy (meth)acrylate, phenoxyethyl (meth)acrylate, phenoxypropyl (meth)acrylate, phenoxydiethylene glycol (meth)acrylate, ethylene oxide-modified nonylphenol (meth)acrylate, ethylene oxide-modified cresol (meth)acrylate, phenol ethylene oxide-modified (meth)acrylate, 2-hydroxy-3-phenoxypropyl (meth)acrylate, methoxybenzyl (meth)acrylate, chlorobenzyl (meth)acrylate, cresyl (meth)acrylate, and polystyryl (meth)acrylate; (meth)acrylates each having a naphthalene ring, such as hydroxyethylated β-naphthol acrylate, 2-naphthoethyl (meth)acrylate, 2-naphthoxyethyl acrylate, and 2-(4-methoxy-1-naphthoxy)ethyl (meth)acrylate; and (meth)acrylates each having a biphenyl ring, such as biphenyl (meth)acrylate.

The content ratio of a constituent unit derived from the aromatic ring-containing (meth)acrylate is preferably 25 parts by weight or less, more preferably 18 parts by weight or less with respect to 100 parts by weight of the (meth)acrylic polymer. When the content ratio falls within such ranges, the thin glass resin laminate A and the thin glass resin laminate piece a each of which is excellent in durability can be obtained.

The weight-average molecular weight of the (meth)acrylic polymer is preferably from 1,000,000 to 2,500,000, more preferably from 1,200,000 to 2,000,000. When the weight-average molecular weight falls within such ranges, the thin glass resin laminate A and the thin glass resin laminate piece a each of which is excellent in durability and heat resistance can be obtained. The weight-average molecular weight is determined from a value calculated from a value measured by gel permeation chromatography (GPC) in terms of polystyrene.

The (meth)acrylic polymer may be obtained through the polymerization of its monomers by any appropriate method.

In one embodiment, the pressure-sensitive adhesive for forming the pressure-sensitive adhesive layer further contains a silane coupling agent. The use of the pressure-sensitive adhesive containing the silane coupling agent enables the formation of a pressure-sensitive adhesive layer excellent in durability. A silane coupling agent having any appropriate functional group may be used as the silane coupling agent. Examples of the functional group include a vinyl group, an epoxy group, an amino group, a mercapto group, a (meth)acryloxy group, an acetoacetyl group, an isocyanate group, a styryl group, and a polysulfide group. Specific examples of the silane coupling agent include: vinyl group-containing silane coupling agents, such as vinyltriethoxysilane, vinyltripropoxysilane, vinyltriisopropoxysilane, and vinyltributoxysilane; epoxy group-containing silane coupling agents, such as γ-glycidoxypropyltrimethoxysilane, γ-glycidoxypropyltriethoxysilane, 3-glycidoxypropylmethyldiethoxysilane, and 2-(3,4-epoxycyclohexyl)ethyltrimethoxysilane; amino group-containing silane coupling agents, such as γ-aminopropyltrimethoxysilane, N-β-(aminoethyl)-γ-aminopropylmethyldimethoxysilane, N-(2-aminoethyl)-3-aminopropylmethyldimethoxysilane, γ-triethoxysilyl-N-(1,3-dimethylbutylidene)propylamine, and N-phenyl-γ-aminopropyltrimethoxysilane; mercapto group-containing silane coupling agents, such as γ-mercaptopropylmethyldimethoxysilane; styryl group-containing silane coupling agents, such as p-styryltrimethoxysilane; (meth) acrylic group-containing silane coupling agents, such as γ-acryloxypropyltrimethoxysilane and γ-methacryloxypropyltriethoxysilane; isocyanate group-containing silane coupling agents, such as 3-isocyanatopropyltriethoxysilane; and polysulfide group-containing silane coupling agents, such as bis(triethoxysilylpropyl)tetrasulfide.

In addition, a silane coupling agent having a plurality of alkoxysilyl groups in a molecule thereof may be used as the silane coupling agent. Specific examples thereof include X-41-1053, X-41-1059A, X-41-1056, X-41-1805, X-41-1818, X-41-1810, and X-40-2651 manufactured by Shin-Etsu Chemical Co., Ltd.

The content of the silane coupling agent is preferably from 0.001 part by weight to 5 parts by weight, more preferably from 0.01 part by weight to 1 part by weight, still more preferably from 0.02 part by weight to 1 part by weight with respect to 100 parts by weight of the base polymer in the pressure-sensitive adhesive.

In one embodiment, a thiol group-containing silane coupling agent is used as the silane coupling agent. The use of the thiol group-containing silane coupling agent enables the formation of a pressure-sensitive adhesive layer excellent in durability and reworkability.

In one embodiment, an oligomer-type thiol group-containing silane coupling agent is used as the thiol group-containing silane coupling agent. The use of the oligomer-type thiol group-containing silane coupling agent enables the formation of a pressure-sensitive adhesive layer particularly excellent in durability and reworkability. Herein, the term "oligomer-type" refers to a polymer that is a dimer of a monomer or more and less than about a 100-mer thereof, and the weight-average molecular weight of the oligomer-type thiol group-containing silane coupling agent is preferably from 300 to 30,000. The oligomer-type thiol group-containing silane coupling agent is preferably an oligomer-type thiol group-containing silane coupling agent having two or more alkoxysilyl groups in a molecule thereof. Specific examples thereof include X-41-1805, X-41-1810, and X-41-1818 manufactured by Shin-Etsu Chemical Co., Ltd.

Although the number of the alkoxysilyl groups of the thiol group-containing silane coupling agent is not particularly limited, the silane coupling agent preferably contains two or more alkoxysilyl groups in a molecule thereof. In addition, the amount of the alkoxy group of the thiol group-containing silane coupling agent is preferably from 10 wt % to 60 wt %, more preferably from 20 wt % to 50 wt %, still more preferably from 20 wt % to 40 wt % in the silane coupling agent.

Although the kind of the alkoxy group is not limited, examples thereof may include alkoxy groups each having 1 to 6 carbon atoms, such as methoxy, ethoxy, propoxy, butoxy, pentyloxy, and hexyloxy groups. Of those, a methoxy or ethoxy group is preferred, and a methoxy group is more preferred. It is also preferred that the thiol group-containing silane coupling agent contain both of methoxy and ethoxy groups in a molecule thereof.

The thiol equivalent (mercapto equivalent) of the thiol group-containing silane coupling agent is preferably 1,000 g/mol or less, more preferably 800 g/mol or less, still more preferably 700 g/mol or less, still more preferably 500 g/mol or less. In addition, the lower limit value of the thiol equivalent is, for example, 200 g/mol or more.

In one embodiment, the pressure-sensitive adhesive for forming the pressure-sensitive adhesive layer further contains a cross-linking agent. An organic cross-linking agent or a polyfunctional metal chelate may be used as the cross-linking agent. Examples of the organic cross-linking agent include an isocyanate-based cross-linking agent, a peroxide-based cross-linking agent, an epoxy-based cross-linking agent, and an imine-based cross-linking agent. In the polyfunctional metal chelate, a polyvalent metal is covalently bonded or coordination-bonded to an organic compound. The isocyanate-based cross-linking agent and/or the peroxide-based cross-linking agent is preferred as the cross-linking agent, and the isocyanate-based cross-linking agent and the peroxide-based cross-linking agent are more preferably used in combination.

A compound having at least two isocyanate groups may be used as the isocyanate-based cross-linking agent. For example, a known aliphatic polyisocyanate, alicyclic polyisocyanate, or aromatic polyisocyanate to be generally used in a urethanization reaction is used.

Examples of the aliphatic polyisocyanate include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the alicyclic isocyanate include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate.

Examples of the aromatic diisocyanate include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

In addition, examples of the isocyanate-based cross-linking agent include a multimer (e.g., a dimer, a trimer, or a pentamer) of the diisocyanate, and a urethane modified body, which is obtained through a reaction with a polyhydric alcohol, such as trimethylolpropane, a urea modified body, a biuret modified body, an alphanate modified body, an isocyanurate modified body, or a carbodiimide modified body thereof.

Examples of commercially available products of the isocyanate-based cross-linking agent include products available under the product names "Millionate MT", "Millionate MTL", "Millionate MR-200", "Millionate MR-400", "Coronate L", "Coronate HL", and "Coronate HX" from Nippon Polyurethane Industry Co., Ltd., and products available under the product names "TAKENATE D-110N", "TAKENATE D-120N", "TAKENATE D-140N", "TAKENATE D-160N", "TAKENATE D-165N", "TAKENATE D-170HN", "TAKENATE D-178N", "TAKENATE 500", and "TAKENATE 600" from Mitsui Chemicals, Inc. Those compounds may be used alone or in combination thereof.

In one embodiment, the isocyanate-based cross-linking agent is preferably any one of the aliphatic polyisocyanate and an aliphatic polyisocyanate-based compound that is a modified body thereof. When the aliphatic polyisocyanate-based compound is used, the cross-linked structure of the pressure-sensitive adhesive is rich in flexibility, and hence facilitates the relaxation of a stress along with the expansion/shrinkage of the pressure-sensitive adhesive layer. Accordingly, a pressure-sensitive adhesive layer excellent in durability and pressure-sensitive adhesive characteristic can be formed. Hexamethylene diisocyanate or a modified body thereof is particularly preferred as the aliphatic polyisocyanate-based compound.

A peroxide having a one-minute half-life temperature of from 80° C. to 160° C. is preferably used as the peroxide-based cross-linking agent, and a peroxide having a one-minute half-life temperature of from 90° C. to 140° C. is more preferably used. Specific examples of the peroxide-based cross-linking agent include di(2-ethylhexyl) peroxydicarbonate (one-minute half-life temperature: 90.6° C.), di(4-t-butylcyclohexyl) peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexyl peroxypivalate (one-minute half-life temperature: 109.1° C.), t-butyl peroxypivalate (one-minute half-life temperature: 110.3° C.), dilauroyl peroxide (one-minute half-life temperature: 116.4° C.), di-n-octanoyl peroxide (one-minute half-life temperature: 117.4° C.), 1,1,3,3-tetramethylbutyl peroxy-2-ethylhexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), t-butyl peroxyisobutyrate (one-minute half-life temperature: 136.1° C.), and 1,1-di(t-hexylperoxy)cyclohexane (one-minute half-life temperature: 149.2° C.). Of those, di(4-t-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used because of its particularly excellent cross-linking reaction efficiency. The half-life of a peroxide is an indication showing the decomposition rate of the peroxide, and refers to a time period required for the remaining amount of the peroxide to reduce by half. A decomposition temperature for obtaining a half-life in any appropriate time and a half-life time at any appropriate temperature are described in a manufacturer's catalog or the like, and are described in, for example, "Organic Peroxide Catalog, 9th Edition (May 2003)" published by Nippon Oil & Fats Co., Ltd.

The content of the cross-linking agent is preferably from 0.01 part by weight to 3 parts by weight, more preferably from 0.02 part by weight to 2 parts by weight, still more preferably from 0.03 part by weight to 1 part by weight with respect to 100 parts by weight of the base polymer. When the content falls within such ranges, a pressure-sensitive adhesive layer having an appropriate creep characteristic, an appropriate modulus of elasticity, and the like can be formed.

In one embodiment, the pressure-sensitive adhesive for forming the pressure-sensitive adhesive layer further contains any appropriate ionic compound. For example, a compound described in JP 2015-4861 A may be used as the ionic compound. Of such compounds, a (perfluoroalkylsulfonyl)imide lithium salt is preferred, and lithium bis(trifluoromethanesulfonylimide) is more preferred. In addition, the content of the ionic compound is preferably 10 parts by weight or less, more preferably 5 parts by weight or less with respect to 100 parts by weight of the base polymer.

The pressure-sensitive adhesive layer may contain any appropriate other additive. Examples of the additive include: polyether compounds of polyalkylene glycols, such as polypropylene glycol; powders, such as a colorant and a pigment; and a dye, a surfactant, a plasticizer, a tackifier, a surface lubricant, a leveling agent, a softening agent, an antioxidant, an age resistor, a light stabilizer, a UV absorber, a polymerization inhibitor, an inorganic or organic filler, a metal powder, a particulate product, and a foil-like product.

A-2. Resin Layer

The resin layer includes any appropriate resin. Examples of the resin for forming the resin layer include a polyvinyl alcohol (PVA)-based resin, a polyolefin-based resin, a cyclic olefin-based resin, a polycarbonate-based resin, a cellulose-based resin, a polyester-based resin, a polyamide-based resin, a polyimide-based resin, a polyether-based resin, a polystyrene-based resin, a (meth)acrylic resin, a (meth)acrylic urethane-based resin, a polysulfone-based resin, an acetate-based resin, an epoxy-based resin, a silicone-based resin, a polyarylate-based resin, a polysulfone-based resin, a polyether imide-based resin, an epoxy-based resin, a urethane-based resin, and a silicone-based resin. In one embodiment, an optical film is used as the resin layer. Examples of the optical film include a polarizing plate (optical film having a polarizing function), a retardation plate, and an isotropic film.

(Polarizing Plate)

In one embodiment, the resin layer is a polarizing plate. When the resin layer is a polarizing plate including a polarizer (in particular, a polarizer including a vinyl alcohol-based resin film), according to the related art, the occurrence of air bubbles at the time of the bonding of the thin glass resin laminate piece a, which is obtained by subjecting the thin glass resin laminate A to the laser processing, to an adherend becomes remarkable. According to the production method of the present invention, even when the thin glass resin laminate A including the polarizing plate is processed, the occurrence of such air bubbles as described above is suppressed. That is, the production method of the present invention is particularly useful in processing the thin glass resin laminate A including the polarizing plate.

The polarizing plate includes a polarizer. The polarizing plate preferably further includes a protective film on one side or each of both sides of the polarizer.

(Polarizer)

The thickness of the polarizer is not particularly limited, and an appropriate thickness may be adopted depending on purposes. The thickness is typically from about 1 μm to about 80 μm. In one embodiment, a thin polarizer is used, and the thickness of the polarizer is preferably 20 μm or less, more preferably 15 μm or less, still more preferably 10 μm or less, particularly preferably 6 μm or less. With the use of such thin polarizer, a thin optical laminate can be obtained.

The polarizer preferably exhibits absorption dichroism at any wavelength in the wavelength range of from 380 nm to 780 nm. The polarizer has a single layer transmittance of preferably 40.0% or more, more preferably 41.0% or more, still more preferably 42.0% or more, particularly preferably 43.0% or more. The polarizer has a polarization degree of preferably 99.8% or more, more preferably 99.9% or more, still more preferably 99.95% or more.

The polarizer is preferably an iodine-based polarizer. More specifically, the polarizer may include an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizer excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. The average polymerization degree may be determined in conformity with JIS K 6726-1994.

A production method for the polarizer is, for example, a method (I) including stretching and dyeing a PVA-based resin film alone, or a method (II) including stretching and dyeing a laminate (i) having a resin substrate and a polyvinyl alcohol-based resin layer. Detailed description of the method (I) is omitted because the method is well known and conventionally used in the art. The production method (II) preferably includes a step of stretching and dyeing the laminate (i) having the resin substrate and the polyvinyl alcohol-based resin layer formed on one side of the resin substrate to produce a polarizer on the resin substrate. The laminate (i) may be formed by applying an application liquid containing a polyvinyl alcohol-based resin onto the resin substrate and drying the applied liquid. In addition, the laminate (i) may be formed by transferring a polyvinyl alcohol-based resin film onto the resin substrate. For example, details about the production method (II) are described in JP 2012-73580 A, which is incorporated herein by reference.

(Protective Film)

Any appropriate resin film may be adopted as the protective film. As a material for forming the protective film, there are given, for example: a polyester-based resin, such as polyethylene terephthalate (PET); a cellulose-based resin, such as triacetylcellulose (TAC); a cycloolefin-based resin, such as a norbornene-based resin; an olefin-based resin, such as polyethylene or polypropylene; and a (meth)acrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, JP 2006-309033 A, JP 2006-317560 A, JP 2006-328329 A, 2006-328334 A, JP 2006-337491 A, JP 2006-337492 A, JP 2006-337493 A, JP 2006-337569 A, JP 2007-009182 A, JP 2009-161744 A, and JP 2010-284840 A, the descriptions of which are incorporated herein by reference.

The resin film for forming the protective film preferably has an ability to absorb UV light. Such resin film may be obtained by, for example, incorporating any appropriate UV absorber. Specific examples of the UV absorber include an oxybenzophenone-based compound, a benzotriazole-based compound, a salicylic acid ester-based compound, a benzophenone-based compound, a cyanoacrylate-based compound, a nickel complex salt-based compound, and a triazine-based compound.

The content of the UV absorber in the resin film is preferably from 0.01 part by weight to 30 parts by weight, more preferably from 0.1 part by weight to 5 parts by weight with respect to 100 parts by weight of the resin film. When the content of the UV absorber falls within such ranges, a protective film having an ability to sufficiently absorb UV light can be formed, and a polarizing plate capable of effectively protecting the thin glass can be obtained.

The resin film for forming the protective film is formed by any appropriate method. Examples of the film-forming method include a melt extrusion method, a solution casting method, a calender method, and a compression forming method. Of those, a melt extrusion method is preferred. In addition, the resin film may be subjected to stretching treatment.

The protective film and the polarizer are laminated on each other via any appropriate adhesive layer. A resin substrate used at the time of the production of the polarizer may be peeled before the lamination of the protective film and the polarizer, or after the lamination.

The thickness of the protective film is preferably from 5 μm to 55 μm, more preferably from 10 μm to 50 μm, still more preferably from 15 μm to 45 μm.

A-3. Thin Glass

Any appropriate thin glass may be adopted as the thin glass as long as the thin glass has a sheet shape. According to classification based on composition, examples of the thin glass include soda-lime glass, borate glass, aluminosilicate glass, and quartz glass. In addition, according to classification based on an alkali component, examples of the thin glass include alkali-free glass and low-alkali glass. The content of an alkali metal component (e.g., $Na_2O$, $K_2O$, $Li_2O$) in the glass is preferably 15 wt % or less, more preferably 10 wt % or less.

The thin glass has a thickness of 100 μm or less, preferably 80 μm or less, more preferably 50 μm or less, still more preferably 40 μm or less, particularly preferably 35 μm or less. The lower limit of the thickness of the thin glass is preferably 5 μm or more, more preferably 10 μm or more.

The thin glass preferably has a light transmittance at a wavelength of 550 nm of 85% or more. The thin glass preferably has a refractive index at a wavelength of 550 nm of from 1.4 to 1.65.

The thin glass has a density of preferably from 2.3 g/cm³ to 3.0 g/cm³, more preferably from 2.3 g/cm³ to 2.7 g/cm³. When the thin glass has a density falling within the above-mentioned ranges, a lightweight optical laminate is obtained.

Any appropriate method may be adopted as a forming method for the thin glass. The thin glass is typically produced by melting a mixture containing a main raw material, such as silica or alumina, a fining agent, such as salt cake or antimony oxide, and a reducing agent, such as carbon, at a temperature of from 1,400° C. to 1,600° C., and forming the molten mixture into a thin sheet shape, followed by cooling. Examples of the forming method for the thin glass include a slot down-draw method, a fusion method, and a float method. The thin glass formed as a sheet shape by any of those methods may be chemically polished with a solvent, such as hydrofluoric acid, as required, in order to reduce its thickness or enhance its smoothness.

As the thin glass, commercially available thin glass may be used as it is, or commercially available thin glass may be used after being polished so as to have a desired thickness. Examples of the commercially available thin glass include "7059", "1737", or "EAGLE 2000" manufactured by Corning Incorporated, "AN100" manufactured by Asahi Glass Co., Ltd., "NA-35" manufactured by NH Techno Glass Corporation, "OA-10" manufactured by Nippon Electric Glass Co., Ltd., and "D 263" or "AF 45" manufactured by Schott AG.

A-4. Laser Processing

Any appropriate laser is used in the step of subjecting the thin glass resin laminate A to the laser processing, and the thin glass resin laminate A is cut with laser light. In the present invention, the thin glass resin laminate A is cut by the laser processing, and hence both of tact and the end surface quality of the thin glass resin laminate piece a can be achieved. In addition, the thin glass resin laminate piece a excellent in end surface quality is advantageous in that the piece hardly breaks and is excellent in handleability.

In the step of subjecting the thin glass resin laminate A to the laser processing, processing marks are arranged on the thin glass resin laminate A with the laser light along cutting schedule lines to enable the cutting of the thin glass resin laminate A. The processing marks may be arranged in a perforated manner along the cutting schedule lines, or may be arranged as continuous lines. In addition, the processing marks may be through-holes penetrating the respective layers, or may be non-through holes. The thin glass resin laminate A is split by applying an external force after the laser processing as required (e.g., when the processing marks are arranged in a perforated manner or when the processing marks are non-through holes).

Examples of the laser include: gas lasers, such as a $CO_2$ laser and an excimer laser; solid lasers, such as a YAG laser; and semiconductor lasers.

In one embodiment, the step of subjecting the thin glass resin laminate A to the laser processing includes the steps of irradiating a surface of the thin glass with laser light, and irradiating a surface of the resin layer with laser light. A laser to be used for the resin layer and a laser to be used for the thin glass are preferably different lasers. In the step, the thin glass resin laminate A can be cut by arranging the processing marks on the respective layers with the laser light.

An ultrashort pulse laser is preferably used as the laser to be used for the irradiation of the thin glass with the laser light. The wavelength of laser light oscillated from the ultrashort pulse laser is preferably from 500 nm to 2,500 nm. The pulse width of the laser light is preferably 100 picoseconds or less, more preferably 50 picoseconds or less. The oscillation mode of the laser light may be single-pulse oscillation, or may be multi-pulse oscillation of a burst mode.

Examples of the laser to be used for the irradiation of the resin layer with the laser light include a $CO_2$ laser, a CO laser, a visible light pulse laser, and a UV pulse laser. Examples of the visible light pulse laser and the UV pulse laser include: a laser that oscillates laser light having a wavelength of 532 nm, 355 nm, 349 nm, or 266 nm (the higher-order harmonic of a solid laser light source using Nd:YAG, Nd:YLF, or $YVO_4$ as a medium); an excimer laser that oscillates laser light having a wavelength of 351 nm, 248 nm, 222 nm, 193 nm, or 157 nm; and an $F_2$ laser that oscillates laser light having a wavelength of 157 nm. In addition, a pulse laser that oscillates laser light having a wavelength outside an ultraviolet region and a pulse width of the order of femtoseconds or picoseconds may be used as the laser. The oscillation mode of the laser light to be used for the irradiation of the resin layer with the laser light may be pulse oscillation, or may be continuous oscillation. The spatial intensity distribution of the laser light may be a Gaussian distribution, or may be a flat-top distribution.

A spot diameter at a position at which the resin layer is irradiated with the laser light is preferably 300 μm or less, more preferably 200 μm or less.

When the thin glass is cut with the ultrashort pulse laser as described above, the thin glass resin laminate A can be cut while the application of damage, such as a crack, to the thin glass is prevented. In addition, when the $CO_2$ laser or the like is used for the resin layer instead of the ultrashort pulse laser, the thermal deterioration of the resin layer can be prevented.

In one embodiment, the resin layer is irradiated with the laser light after the thin glass has been irradiated with ultrashort pulse laser light. With such procedure, the thermal deterioration of the resin layer can be more effectively prevented.

When the processing marks (through-holes or non-through holes) are arranged in a perforated manner, the pitches of the processing marks are preferably 10 μm or less, more preferably 5 μm or less. When the pitches fall within such ranges, the thin glass resin laminate A can be satisfactorily split.

When the thin glass resin laminate A is split after the laser processing, examples of a method for the splitting include: mechanical breaking (mountain folding); the heating of sites near the processing marks with infrared light; the application of vibration with an ultrasonic roller; and adsorption and lifting with a suction cup.

B. Thin Glass Resin Laminate Piece a

In one embodiment, there is provided the thin glass resin laminate piece a. The thin glass resin laminate piece a is a laminate piece produced by the above-mentioned production method, that is, a laminate piece obtained by cutting the thin glass resin laminate A (resin laminate, which includes the thin glass, the resin layer, and the pressure-sensitive adhesive layer in the stated order, and in which the thickness (μm) of the pressure-sensitive adhesive layer and the creep characteristic (μm/Hr) of the pressure-sensitive adhesive layer have a relationship of (thickness (μm))×creep characteristic (μm/Hr)≥2,500 (μm·μm/Hr)) through the laser processing. Such thin glass resin laminate piece a is preferred because air bubbles hardly occur in the pressure-sensitive adhesive layer when the piece is bonded to an adherend.

EXAMPLES

Now, the present invention is specifically described by way of Examples. However, the present invention is not limited by these Examples. In Examples, "part(s)" and "%" are by weight unless otherwise specified.

Production Example 1

Preparation of Pressure-Sensitive Adhesive (1)

A monomer mixture containing 99 parts by weight of butyl acrylate and 1 part by weight of 4-hydroxybutyl acrylate was loaded into a four-necked flask including a stirring blade, a temperature gauge, a nitrogen gas-introducing tube, and a condenser. Further, 0.1 part by weight of 2,2'-azobisisobutyronitrile was loaded as a polymerization initiator into 100 parts by weight of the monomer mixture (solid content) together with 100 parts by weight of ethyl acetate, and a nitrogen gas was introduced to purge the flask with nitrogen while the mixture was gently stirred. After that, the temperature of the liquid in the flask was kept at around 55° C., and a polymerization reaction was performed for 8 hours to prepare a solution of an acrylic polymer having a weight-average molecular weight (Mw) of 1,560,000 and a polydispersity Mw/Mn of 3.2.

100 Parts by weight of the solid content of the solution of the acrylic polymer was blended with 0.1 part by weight of an isocyanate cross-linking agent (manufactured by Mitsui Chemicals, Inc., product name: "TAKENATE D160N," trimethylolpropane hexamethylene diisocyanate), 0.3 part by weight of benzoyl peroxide (manufactured by Nippon Oil & Fats Co., Ltd., product name: "NYPER BMT 40SV"), 0.3 part by weight of an acetoacetyl group-containing silane coupling agent (manufactured by Soken Chemical & Engineering Co., Ltd., product name: "A-100"), and 0.1 part by weight of a polyether compound (manufactured by Kaneka Corporation, product name: "SILYL SAT10," polyether compound having a reactive silyl group) to provide an acrylic pressure-sensitive adhesive (1).

Production Example 2

Preparation of Pressure-Sensitive Adhesive (2)

99 Parts by weight of butyl acrylate, 1.0 part by weight of 4-hydroxybutyl acrylate, and 0.3 part by weight of 2,2'-azobisisobutyronitrile were loaded into a reaction vessel including a condenser tube, a nitrogen-introducing tube, a temperature gauge, and a stirring apparatus together with ethyl acetate, and the mixture was subjected to a reaction at 60° C. for 4 hours in a stream of a nitrogen gas. After that, ethyl acetate was added to the reaction liquid to provide a solution containing an acrylic polymer having a weight-average molecular weight of 1,650,000.

100 Parts by weight of the solid content of the acrylic polymer solution was blended with 0.3 part by weight of dibenzoyl peroxide (manufactured by Nippon Oil & Fats Co., Ltd., product name: "NYPER BO-Y"), 0.02 part by weight of trimethylolpropane xylene diisocyanate (manufactured by Mitsui Takeda Chemicals Inc., product name: "TAKENATE D110N"), and 0.2 part by weight of an acetoacetyl group-containing silane coupling agent (manufactured by Soken Chemical & Engineering Co., Ltd., product name: "A-100") to provide an acrylic pressure-sensitive adhesive (2).

Production Example 3

Preparation of Pressure-Sensitive Adhesive (3)

81.9 Parts by weight of butyl acrylate, 13 parts by weight of benzyl acrylate, 5 parts by weight of acrylic acid, 0.1 part by weight of 4-hydroxybutyl acrylate, and 0.1 part by weight of 2,2'-azobisisobutyronitrile were loaded into a four-necked flask including a stirring blade, a temperature gauge, a nitrogen gas-introducing tube, and a condenser together with 100 parts of ethyl acetate (monomer concentration: 50%), and a nitrogen gas was introduced to purge the flask with nitrogen while the mixture was gently stirred. After that, the temperature of the liquid in the flask was kept at around 55° C., and a polymerization reaction was performed for 8 hours to prepare a solution of an acrylic polymer having a weight-average molecular weight (Mw) of 2,000,000 and a polydispersity Mw/Mn of 2.9.

100 Parts of the solid content of the acrylic polymer solution was blended with 0.45 part by weight of an isocyanate cross-linking agent (manufactured by Nippon Polyurethane Industry Co., Ltd., product name: "CORONATE L," tolylene diisocyanate adduct of trimethylolpropane), 0.1 part by weight of benzoyl peroxide (manufactured by Nippon Oil & Fats Co., Ltd., product name: "NYPER BMT"), and 0.1 part by weight of a silane coupling agent (manufactured by Shin-Etsu Chemical Co., Ltd., product name: "KBM-403") to prepare an acrylic pressure-sensitive adhesive (3).

Production Example 4

Production of Resin Layer (Polarizing Plate) (1)

A polyvinyl alcohol film having a thickness of 75 μm (manufactured by Kuraray Co., Ltd., product name: "VF-PS #7500," width: 1,000 mm) was stretched at a stretching ratio of up to 2.5 times while being immersed in pure water at 30° C. for 60 seconds. Next, the film was dyed in an aqueous solution of iodine at 30° C. (weight ratio: pure water/iodine (I)/potassium iodide (KI)=100/0.01/1) for 45 seconds. After that, the film was stretched in a 4 wt % aqueous solution of boric acid so that its stretching ratio became 5.8 times. After the stretching, the film was immersed in pure water for 10 seconds, and was then dried at 50° C. for 3 minutes while the tension of the film was kept. Thus, a polarizer was obtained. The polarizer had a thickness of 25 μm.

A urethane-based easy-adhesion layer having a thickness of 0.5 μm was formed on a protective film (triacetylcellulose (TAC) film, thickness: 30 μm). After that, an active energy ray-curable adhesive was applied to the easy-adhesion layer with a MCD coater (manufactured by Fuji Kikai Kogyo Co., Ltd.) (cell shape: honeycomb, number of gravure roll lines: 1,000 lines/inch, rotational speed: 140% with respect to a line speed) so that the thickness of an adhesive layer became 0.5 μm. Next, the transparent protective film was bonded to each of both surfaces of the polarizer via the adhesive with a roller machine. After that, the bonded transparent protective films on both sides were warmed to 50° C. with an IR heater, and a UV light was applied to both the surfaces to cure the active energy ray-curable adhesive. Further, the cured product was dried with hot air at 70° C. for 3 minutes to provide a polarizing plate (1) having the protective films on both the surfaces of the polarizer. The line speed of the bonding was 25 m/min.

Production Example 5

Production of Resin Layer (Polarizing Plate) (2)

An amorphous polyethylene terephthalate (hereinafter sometimes referred to as "PET") (IPA-copolymerized PET) film (thickness: 100 μm) containing 7 mol % of an isophthalic acid unit was prepared as a thermoplastic resin substrate, and its surface was subjected to corona treatment (58 W/m$^2$/min). Meanwhile, PVA (polymerization degree: 4,200, saponification degree: 99.2%) having added thereto 1 wt % of acetoacetyl-modified PVA (manufactured by the Nippon Synthetic Chemical Industry Co., Ltd., product name: GOHSEFIMER Z-200 (average polymerization degree: 1,200, saponification degree: 98.5 mol %, acetoacetylation degree: 5 mol %)) was prepared, and an application liquid formed of a PVA aqueous solution containing 5.5 wt % of the PVA-based resin was prepared. The application liquid was applied to the substrate so that its thickness after drying became 12 μm, followed by drying with hot air under an atmosphere at 60° C. for 10 minutes. Thus, a laminate having a PVA-based resin layer arranged on the substrate was produced.

Next, first, the laminate was subjected to free-end stretching in the air at 130° C. and at 1.8 times (in-air auxiliary stretching) to produce a stretched laminate. Next, a step of insolubilizing the PVA layer in which PVA molecules in the stretched laminate were aligned was performed by immersing the stretched laminate in an insolubilizing aqueous solution of boric acid having a liquid temperature of 30° C. for 30 seconds. In the insolubilizing aqueous solution of boric acid in the step, a boric acid content was set to 3 parts by weight with respect to 100 parts by weight of water. The stretched laminate was dyed to produce a colored laminate. The colored laminate was obtained as follows: the PVA layer in the stretched laminate was dyed with iodine by immersing the stretched laminate in a dyeing liquid having a liquid temperature of 30° C., and containing iodine and potassium iodide for any appropriate time period so that the single layer transmittance of a PVA layer for forming a polarizer to be finally produced became from 40% to 44%. In the step, the dyeing liquid contained water as a solvent, and its iodine concentration was set within the range of from 0.1 wt % to 0.4 wt %, while its potassium iodide concentration was set within the range of from 0.7 wt % to 2.8 wt %. A ratio between the concentrations of iodine and potassium iodide is 1:7. Next, a step of subjecting the PVA molecules of the PVA layer that had been caused to adsorb iodine to cross-linking treatment was performed by immersing the colored laminate in a cross-linking aqueous solution of boric acid at 30° C. for 60 seconds. In the cross-linking aqueous solution of boric acid in the step, a boric acid content was set to 3 parts by weight with respect to 100 parts by weight of water, and a potassium iodide content was set to 3 parts by weight with respect to 100 parts by weight of water.

Further, the resultant colored laminate was stretched in an aqueous solution of boric acid at a stretching temperature of 70° C. in the same direction as that of the stretching in the air at 3.05 times (stretching in boric acid water) to provide an optical film laminate having a final stretching ratio of 5.50 times. The optical film laminate was removed from the aqueous solution of boric acid, and boric acid adhering to the surface of its PVA layer was washed off with an aqueous solution whose potassium iodide content was set to 4 parts by weight with respect to 100 parts by weight of water. The washed optical film laminate was dried by a step of drying the laminate with warm air at 60° C. The polarizer in the resultant optical film laminate had a thickness of 5 µm.

A methacrylic resin pellet including a glutarimide ring unit was dried at 100.5 kPa and 100° C. for 12 hours, and was extruded from the T-die of a single-screw extruder at a die temperature of 270° C. to be formed into a film shape. The film was stretched in a conveying direction (MD direction) under an atmosphere at a temperature higher than the Tg of the resin by 10° C. Next, the film was stretched in a direction perpendicular to the film-conveying direction (TD direction) under an atmosphere at a temperature higher than the Tg of the resin by 7° C. to provide an acrylic film having a thickness of 40 µm.

35 Parts by weight of N-hydroxyethyl acrylamide HEAA (manufactured by Kohjin Co., Ltd.), 45 parts by weight of N-acryloylmorpholine ACMO (manufactured by Kohjin Co., Ltd.), 25 parts by weight of polypropylene glycol diacrylate TPGDA (manufactured by Toagosei Co., Ltd., product name: "ARONIX M-220"), 3 parts by weight of a photopolymerization initiator (manufactured by Ciba Specialty Chemicals, product name: "IRGACURE 184"), and 1.5 parts by weight of another photopolymerization initiator (manufactured by Nippon Kayaku Co., Ltd., product name: "KAYACURE DETX-S") were mixed to provide a curable adhesive.

The curable adhesive was applied to the polarizer produced on the thermoplastic resin substrate so as to have an application thickness of about 1 µm. Next, the acrylic film was bonded onto the applied layer of the adhesive. The UV light of a conveyor-type UV irradiation apparatus (manufactured by Fusion UV Systems, Inc.) having a peak UV irradiance of 1,600 mW/cm$^2$ and a UV integrated light quantity of 1,000 mJ/cm$^2$ (wavelength: from 380 nm to 440 nm) was applied from a thermoplastic resin substrate side to cure the adhesive, and the cured product was further dried at 70° C. for 2 minutes. Finally, the PET film was peeled from the laminate obtained by laminating the acrylic film, the polarizer, and the PET film. Thus, a polarizing plate (2) was obtained.

Example 1

A glass film (manufactured by Nippon Electric Glass Co., Ltd., product name: "OA-10," thickness: 100 µm) and the polarizing plate (1) were bonded to each other via an adhesive. Next, the pressure-sensitive adhesive (1) was applied onto the polarizing plate so that its thickness after drying became 30 µm. Thus, a thin glass resin laminate A having the configuration "thin glass (100 µm)/resin layer (polarizing plate (1))/pressure-sensitive adhesive layer (30 µm)" was obtained.

The thin glass resin laminate A was subjected to laser processing to provide a thin glass resin laminate piece a. Conditions for the laser processing are as described below.

The thin glass resin laminate A was placed on a stage with the pressure-sensitive adhesive layer facing upward, and the thin glass resin laminate A was half-cut by removing the pressure-sensitive adhesive layer and the resin layer with a $CO_2$ laser (manufactured by Keyence Corporation, ML-G9321, 250 kHz, output: 40%, speed: 500 mm/s, number of times of passing: twice) along a cutting line in accordance with the size of the thin glass resin laminate piece a.

Next, the thin glass resin laminate A was placed on the stage with its thin glass surface side facing upward, and the thin glass resin laminate A was cut by removing its glass layer with a pulse laser (manufactured by Radiance, Inc., pulse irradiation time: 350 fs, 125 kHz, wavelength: 1,053 nm, output: 10 W, speed: 200 mm/s, number of times of passing: 12 times) along the cutting line.

Example 2

A thin glass resin laminate A was obtained in the same manner as in Example 1 except that the thickness of the pressure-sensitive adhesive layer was set to 40 µm. The thin glass resin laminate A was subjected to the same laser processing as that of Example 1.

Example 3

A thin glass resin laminate A was obtained in the same manner as in Example 1 except that: the pressure-sensitive adhesive (2) was used instead of the pressure-sensitive adhesive (1); and the thickness of the pressure-sensitive adhesive layer was set to 20 µm. The thin glass resin laminate A was subjected to the same laser processing as that of Example 1.

Example 4

A thin glass resin laminate A was obtained in the same manner as in Example 1 except that the pressure-sensitive adhesive (2) was used instead of the pressure-sensitive adhesive (1). The thin glass resin laminate A was subjected to the same laser processing as that of Example 1.

Example 5

A thin glass resin laminate A was obtained in the same manner as in Example 3 except that the polarizing plate (2) was used instead of the polarizing plate (1). The thin glass resin laminate A was subjected to the same laser processing as that of Example 1.

Comparative Example 1

A thin glass resin laminate A was obtained in the same manner as in Example 1 except that: the pressure-sensitive adhesive (3) was used instead of the pressure-sensitive adhesive (1); and the thickness of the pressure-sensitive adhesive layer was set to 20 µm. The thin glass resin laminate A was subjected to the same laser processing as that of Example 1.

Comparative Example 2

A thin glass resin laminate A was obtained in the same manner as in Example 1 except that the thickness of the pressure-sensitive adhesive layer was set to 20 µm. The thin glass resin laminate A was subjected to the same laser processing as that of Example 1.

Comparative Example 3

A thin glass resin laminate A was obtained in the same manner as in Comparative Example 2 except that the polarizing plate (2) was used instead of the polarizing plate (1). The thin glass resin laminate A was subjected to the same laser processing as that of Example 1.

Comparative Example 4

A thin glass resin laminate A was obtained in the same manner as in Comparative Example 1. The thin glass resin laminate A was subjected to end mill processing. Conditions for the end mill processing are as described below.

The thin glass resin laminate A was punched into a predetermined size, and the 40 punched laminates were superimposed to provide a workpiece. The outer peripheral surface of the workpiece was subjected to cutting by the end mill processing under a state in which the workpiece was interposed in a clamp (jig). Herein, the cutting tool of the end mill had a tool angle of 10°, and the number of blades of the used tool was 6. The cutting was performed under the following conditions: a number of revolutions of 30,000 rpm, an indentation amount of 0.15 mm, a feeding speed of 1,440 mm/min, and a number of times of cutting of once.

Reference Example 1

The pressure-sensitive adhesive (3) was applied onto a glass film (manufactured by Nippon Electric Glass Co., Ltd., product name: "OA-10," thickness: 100 μm) so that its thickness after drying became 20 μm. Thus, a laminate was obtained. The resultant laminate was subjected to the same laser processing as that of Example 1.

Reference Example 2

The pressure-sensitive adhesive (3) was applied onto a polarizing plate (1) so that its thickness after drying became 20 μm. Thus, a laminate was obtained. The resultant laminate was subjected to the same laser processing as that of Example 1.

<Evaluation>

The laminate pieces of Examples, Comparative Examples, and Reference Examples obtained after the laser processing (or the end mill processing) were subjected to the following evaluations. The results are shown in Table 1.

(1) Creep Characteristic of Pressure-Sensitive Adhesive Layer

A pressure-sensitive adhesive layer having a thickness of 20 μm was formed from a pressure-sensitive adhesive used in each experimental example on a TAC film having a thickness of 30 μm to provide a pressure-sensitive adhesive film. The pressure-sensitive adhesive film was cut out into a size measuring 10 mm by 30 mm, and the upper end portion of the pressure-sensitive adhesive film measuring 10 mm by 10 mm was bonded to a SUS plate via the pressure-sensitive adhesive layer, followed by autoclave treatment under the conditions of 50° C. and 5 atm for 15 minutes. The treated product was left to stand for 1 hour while a load of 500 g was applied to the lower end portion of the pressure-sensitive adhesive film. A shift width between the pressure-sensitive adhesive film and the SUS plate after the application of the load with respect to a distance therebetween before the application was measured, and was adopted as a creep value.

(2) Modulus of Elasticity of Pressure-Sensitive Adhesive Layer

Pressure-sensitive adhesive layers were formed from a pressure-sensitive adhesive used in each experimental example, and the pressure-sensitive adhesive layers were laminated to produce a test sample having a thickness of about 1.5 mm. The test sample was punched into a disc shape having a diameter of 7.9 mm, and was sandwiched between parallel plates, followed by the performance of dynamic viscoelasticity measurement with "Advanced Rheometric Expansion System (ARES)" manufactured by Rheometric Scientific under the following conditions. The storage modulus of elasticity G' of each of the pressure-sensitive adhesive layers at 25° C. was read from the result of the measurement.

(Measurement Conditions)

Figure 2:
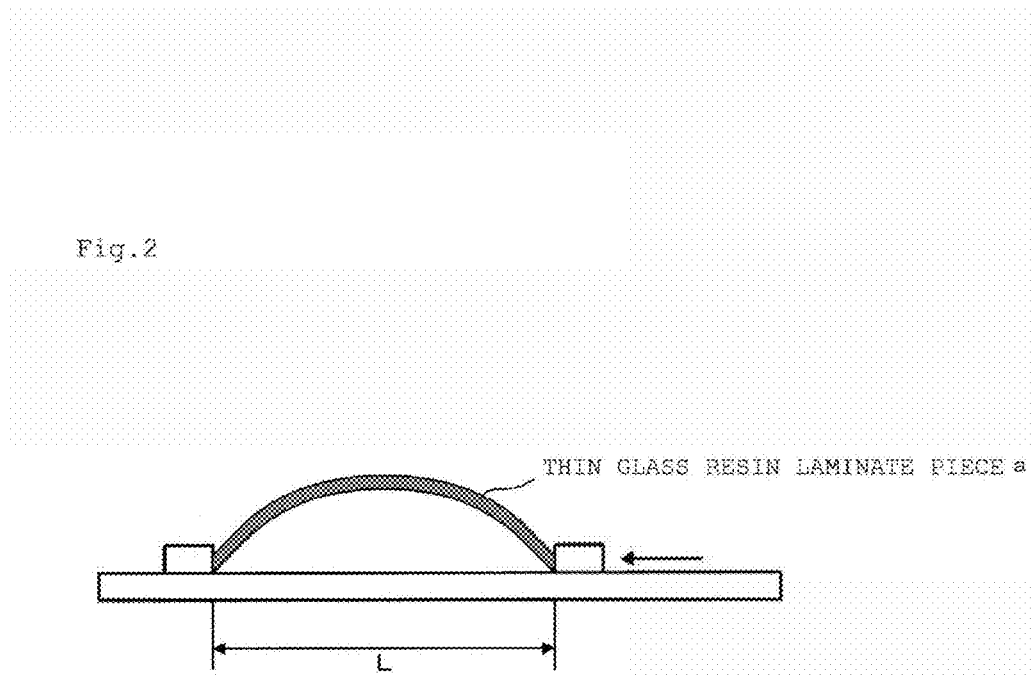
FIG. 2 is a schematic view for illustrating a method of evaluating end surface quality in Examples.

Deformation mode: Distortion
Measurement temperature: From −40° C. to 150° C.
Rate of temperature increase: 5° C./min (3) End Surface Quality A thin glass resin laminate piece a measuring 60 cm by 110 cm was prepared, and such a two-point bending test as illustrated in FIG. 2 was performed with its pressure-sensitive adhesive layer surface bent in a concave shape. A case in which a distance L between the two points of the laminate piece when a crack occurred in the laminate piece was 100 mm or less, and the laminate piece was not divided by the crack was evaluated as being passable ("∘" in the table).

(4) Edge Air Bubbles

A 20-centimeter square thin glass resin laminate piece a was prepared, and the laminate piece a was bonded to the center of a 30-centimeter square plate glass via its pressure-sensitive adhesive layer with a roller. Next, the edges of the four sides of the bonded laminate piece a were visually observed, and the number of the sides where air bubbles were observed was counted.

TABLE 1

| | Thickness of thin glass (μm) | Resin layer (polarizing plate) | Pressure-sensitive adhesive layer | | | | | | | |
|---|---|---|---|---|---|---|---|---|---|---|
| | | | Pressure-sensitive adhesive | Thickness (μm) | Creep characteristic (μm/hr) | Thickness$^2$ × Creep characteristic (μm$^2$ · μm/hr) | Modulus of elasticity (N/mm) | Processing approach | End surface quality (handleability) | Air bubbles |
| Example 1 | 100 | (1) | (1) | 30 | 120 | 108 × 10$^3$ | 0.1 | Laser | ∘ | 0/4 |
| Example 2 | 100 | (1) | (1) | 40 | 120 | 192 × 10$^3$ | 0.1 | Laser | ∘ | 0/4 |
| Example 3 | 100 | (1) | (2) | 20 | 250 | 100 × 10$^3$ | 0.1 | Laser | ∘ | 1/4 |
| Example 4 | 100 | (1) | (2) | 30 | 250 | 225 × 10$^3$ | 0.1 | Laser | ∘ | 0/4 |
| Example 5 | 100 | (2) | (2) | 20 | 250 | 100 × 10$^3$ | 0.1 | Laser | ∘ | 1/4 |
| Comparative | 100 | (1) | (3) | 20 | 60 | 24 × 10$^3$ | 0.16 | Laser | ∘ | 4/4 |

TABLE 1-continued

|  | Thickness of thin glass (μm) | Resin layer (polarizing plate) | Pressure-sensitive adhesive layer Pressure-sensitive adhesive | Thickness (μm) | Creep characteristic (μm/hr) | Thickness² × Creep characteristic (μm² · μm/hr) | Modulus of elasticity (N/mm) | Processing approach | End surface quality (handleability) | Air bubbles |
|---|---|---|---|---|---|---|---|---|---|---|
| Example 1 | | | | | | | | | | |
| Comparative Example 2 | 100 | (1) | (1) | 20 | 120 | $48 \times 10^3$ | 0.1 | Laser | ○ | 4/4 |
| Comparative Example 3 | 100 | (2) | (1) | 20 | 120 | $48 \times 10^3$ | 0.1 | Laser | ○ | 2/4 |
| Comparative Example 4 | 100 | (1) | (3) | 20 | 60 | $24 \times 10^3$ | 0.16 | End mill | x | 0/4 |
| Reference Example 1 | 100 | — | (3) | 20 | 60 | $24 \times 10^3$ | 0.16 | Laser | x | 0/4 |
| Reference Example 2 | — | (1) | (3) | 20 | 60 | $24 \times 10^3$ | 0.16 | Laser | ○ | 0/4 |

As is apparent from Table 1, according to the production method of the present invention, there can be obtained the thin glass resin laminate piece, which is excellent in end surface quality and hardly causes air bubbles at the time of its bonding. In addition, none of the laminate free of any resin layer (thin glass/pressure-sensitive adhesive layer; Reference Example 1) and the laminate free of any thin glass (resin layer (polarizing plate)/pressure-sensitive adhesive layer; Reference Example 2) causes air bubbles at the time of its bonding despite the fact that the laminates each include a pressure-sensitive adhesive layer comparable to those of Comparative Examples. It is understood from those Reference Examples that the invention of the present application is an invention for solving a problem specific to the production of the thin glass resin laminate piece a (thin glass/resin layer/pressure-sensitive adhesive layer).

REFERENCE SIGNS LIST 10 thin glass
20 resin layer
30 pressure-sensitive adhesive layer

The invention claimed is:

1. A method of producing a thin glass resin laminate piece, comprising a step of subjecting a thin glass resin laminate including a thin glass having a thickness of 100 μm or less, a resin layer, and a pressure-sensitive adhesive layer in the stated order to laser processing to cut the laminate, wherein a thickness (μm) of the pressure-sensitive adhesive layer and a creep characteristic (μm/Hr) of the pressure-sensitive adhesive layer have a relationship of (thickness (μm))² × creep characteristic (μm/Hr) ≥ 50×10³ (μm²·μm/Hr).

2. The method of producing a thin glass resin laminate piece according to claim 1, wherein the thickness of the pressure-sensitive adhesive layer is 10 μm or more.

3. The method of producing a thin glass resin laminate piece according to claim 1, wherein the creep characteristic of the pressure-sensitive adhesive layer is 100 μm/Hr or more.

4. The method of producing a thin glass resin laminate piece according to claim 1, wherein the resin layer is a polarizing plate.

5. The method of producing a thin glass resin laminate piece according to claim 1,
wherein the step of subjecting the thin glass resin laminate to the laser processing to cut the laminate includes the steps of
irradiating a surface of the thin glass with laser light, and
irradiating a surface of the resin layer with laser light, and
wherein a laser to be used for the resin layer and a laser to be used for the thin glass are different lasers.

6. The method of producing a thin glass resin laminate piece according to claim 5, wherein the laser to be used for the irradiation of the thin glass with the laser light is an ultrashort pulse laser.

7. The method of producing a thin glass resin laminate piece according to claim 5, wherein the laser to be used for the irradiation of the resin layer with the laser light is a $CO_2$ laser, a CO laser, a visible light pulse laser, or a UV pulse laser.

* * * * *